United States Patent [19]

Maitland et al.

[11] Patent Number: 4,839,554
[45] Date of Patent: Jun. 13, 1989

[54] APPARATUS FOR FORMING AN ELECTRON BEAM SHEET

[75] Inventors: Arthur Maitland, St. Andrews, Scotland; Ian A. Strudwick; Clifford R. Weatherup, both of Chelmsford, United Kingdom

[73] Assignee: English Electric Valve Company Limited, Chelmsford, United Kingdom

[21] Appl. No.: 90,454

[22] Filed: Aug. 28, 1987

[30] Foreign Application Priority Data

Aug. 30, 1986 [GB] United Kingdom ............... 8621022

[51] Int. Cl.⁴ ............................................. H01J 1/16
[52] U.S. Cl. ................................... 313/446; 313/574; 313/581; 372/87
[58] Field of Search ............... 313/446, 574, 441, 581, 313/161; 372/2, 81

[56] References Cited

U.S. PATENT DOCUMENTS

| | | | |
|---|---|---|---|
| 3,864,640 | 2/1975 | Bennett | 313/441 |
| 4,180,784 | 12/1979 | Nelson et al. | 372/81 |
| 4,308,507 | 12/1981 | Pleasance et al. | 372/82 |
| 4,545,056 | 10/1985 | Wortman et al. | 372/2 |
| 4,596,945 | 6/1986 | Schumacher et al. | 313/161 |
| 4,698,546 | 10/1987 | Maitland et al. | 313/446 |

FOREIGN PATENT DOCUMENTS

| | | |
|---|---|---|
| 456776 | 11/1936 | United Kingdom . |
| 1121115 | 7/1968 | United Kingdom . |
| 1292016 | 10/1972 | United Kingdom . |
| 1520935 | 8/1978 | United Kingdom . |
| 2150742 | 7/1985 | United Kingdom . |
| 2169131 | 7/1986 | United Kingdom . |
| 2170949 | 8/1986 | United Kingdom . |

*Primary Examiner*—Léon Scott, Jr.
*Attorney, Agent, or Firm*—Spencer & Frank

[57] ABSTRACT

Apparatus for forming an electron beam sheet includes a cathode member having a slot in a front surface thereof, a grid electrode and the anode of a thyratron. When it is desired to trigger the thyratron into conduction, a suitably large potential difference is applied between the cathode member and the grid, resulting in an electron beam sheet being produced extensive of a slot formed in the front surface of the cathode member. This produces ionisation and a main discharge current is established between the main anode and cathode of the thyratron.

14 Claims, 2 Drawing Sheets

APPARATUS FOR FORMING AN ELECTRON BEAM SHEET

FIELD OF THE INVENTION

This invention relates to apparatus for forming an electron beam, and more particularly for forming an electron beam sheet which extends over a relatively large region.

SUMMARY OF THE INVENTION

According to this invention, there is provided apparatus for forming an electron beam sheet comprising a metal cathode member having an elongate slot in a surface thereof and an anode member, the cathode and anode members being arranged within a gas-filled envelope, and the arrangement being such that on application of a suitably large potential difference between the anode and cathode members an electron beam sheet is formed extensive in a direction away from the slot. By "electron beam sheet" it is meant that the electron beam is produced along substantially the whole of the length of the slot and extends outwards from it. The potential difference required to obtain the electron beam sheet depends on the particular arrangement employed, and is typically a few kilovolts. The electron beam sheet is produced as a result of gas discharge processes, in which the walls of the slot are bombarded by ions produced on application of the large potential difference, causing secondary emission of electrons from the slot surfaces which add to the beam sheet. The electron beam sheet obtained is highly collimated, and, above a certain threshold current, its width and length are determined by the width and length of the slot. The direction in which the electron beam sheet is formed is determined by the configuration of the cathode member surface in which the slot is located, the sheet being produced normal to the surface of the cathode member at the slot. Some degree of focusing may be obtained by curving the surface in which the slot is located. Substantially all surfaces of the cathode member may be coated with a layer of electrically insulating material, except within the slot, since this tends to enable a larger electron beam sheet current density to be obtained for a given current than when such an insulating layer is not employed.

In a thyratron in accordance with the invention, the anode member may be arranged to be the main cathode itself, or one of the thyratron grids, or another electrode included specifically for that purpose.

The slot may be any convenient configuration, for example it may be helical, but it is preferred for many applications that the slot be arcuate. It may be advantageous that the slot is continuous, that is, that it has no ends, for example it may be circular. The surface configuration of the cathode member around the slot may be chosen such that the electron beam sheet is formed in a substantially single plane, or it could be made conical, for example. Where the electron beam sheet is arranged to extend in a single plane it may be arranged to extend substantially continuously over an area defined by the slot, such that where the slot is circular, the electron beam sheet is produced over substantially all the area surrounded by the slot.

Advantageously, for some applications a plurality of slots are included in the apparatus. An electron beam sheet is then produced extensive of each of the slots, and each electron beam sheet has an energy and magnitude which is substantially unaffected by the presence of the others. Thus the total energy available may be increased over that available when only one slot is included in the apparatus.

According to a first feature of the invention, a thyratron arrangement includes apparatus in accordance with the invention, wherein the electron beam sheet is arranged to produce ionisation within the thyratron. The electron beam sheet may then be used to trigger the thyratron into the conducting state. Preferably, a control grid electrode is included in the thyratron, being arranged between the main anode and main cathode, and the electron beam sheet is arranged to be directed into the region of the grid apertures.

Advantageously, the electron beam sheet may be directed so as to produce uniform ionisation over substantially all of a cross-sectional area between the thyratron main anode and cathode, thus reducing jitter and rise time of the main discharge current between the main cathode and anode.

The electron beam sheet may advantageously be arranged to produce a primary discharge between a cathode and a grid within the thyratron, prior to the thyratron conducting its main current. More than one cathode member may be included, for example, one may be used to produce a primary discharge and another arranged to trigger the thyratron.

Advantageously, the anode member may form part of the wall of the thyratron, and one anode member may be associated with more than one slot.

According to a second feature of the invention, a laser arrangement includes apparatus in accordance with the invention, wherein the electron beam is arranged to provide pumping power to a material which is arranged to form part at least of a laser active medium.

BRIEF DESCRIPTION OF THE DRAWINGS

Some ways in which the invention may be performed are now further described by way of example with reference to the accompanying drawings in which.

DETAILED DESCRIPTION OF PREFERRED EMBODIMENTS

Figure 1:
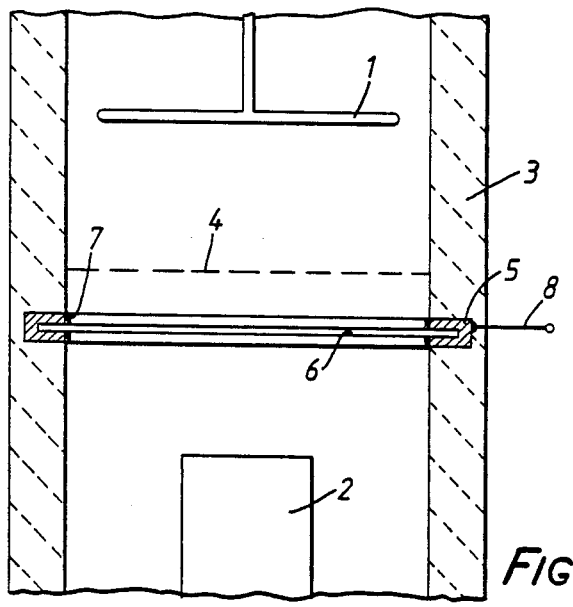
FIGS. 1, 2 and 3 are schematic sectional views of respective thyratron arrangements in accordance with the invention.

With reference to FIG. 1, a thyratron arrangement includes a thyratron anode 1 and a main cathode 2 located within a ceramic envelope or wall 3, being spaced apart from one another and having a control grid electrode 4 located between them. The envelope 3 also contains a hydrogen gas filling at a typical thyratron pressure, say a fraction of a torr or so. A metallic cathode member 5 is located between the grid 4 and the cathode 2 and comprises a metallic ring set into the thyratron wall 3. A slot 6 is included in the front surface of the cathode member 5 and extends continuously and circumferentially around the inside of the cathode member 5. Most of the cathode member 5 is surrounded by the envelope 3 and a layer 7 of electrically insulating material is laid down on its front surface to insulate the metallic cathode member 5 from the gas filling, except for within the slot 6, the surfaces of which are bare of insulating material. An electrical lead 8 enables the cathode 5 to be attached to a source of suitable potential.

The grid 4 is maintained at a negative potential to prevent breakdown and conduction between the anode 1 and main cathode 2 of the thyratron during the hold-off period. When it is desired to trigger the thyratron into conduction, a relatively large positive potential of a few kilovolts is applied to the grid 4, resulting in a electron beam sheet being produced along the length of the slot 6 of the cathode member 5 and across the width of the thyratron. Thus ionisation is produced and a main discharge current is established between the anode 1 and main cathode 2.

Figure 2:
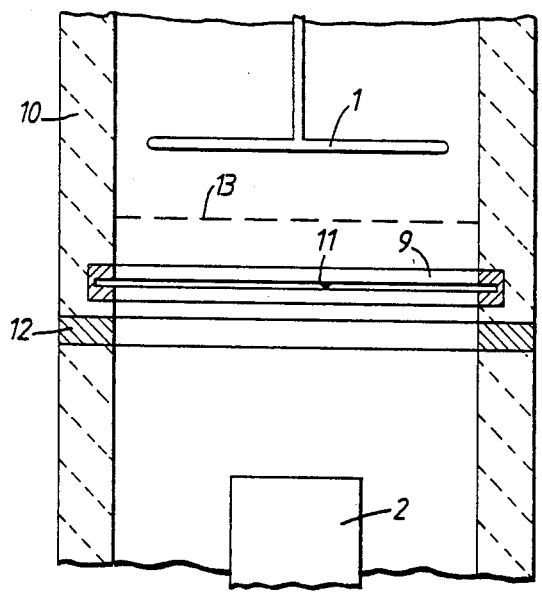

With reference to FIG. 2, in another thyratron arrangement a cathode member 9 is located in the envelope wall 10 and has a slot 11 in the surface thereof which faces the interior of the thyratron. In this embodiment, no electrically insulating material covers its front surface. An anode member 12 is located between the cathode member 9, and the main cathode 2. A control grid 13 is positioned between the main anode 1 and the cathode member 9. During operation, a potential difference is established between the anode member 12 and the cathode member 9 such that an electron beam sheet is produced extensive of the slot 11. The resulting ionization acts as a primary discharge, so that when a trigger potential is applied to the control grid 13, the main discharge current is established quickly and with low jitter.

Figure 3:
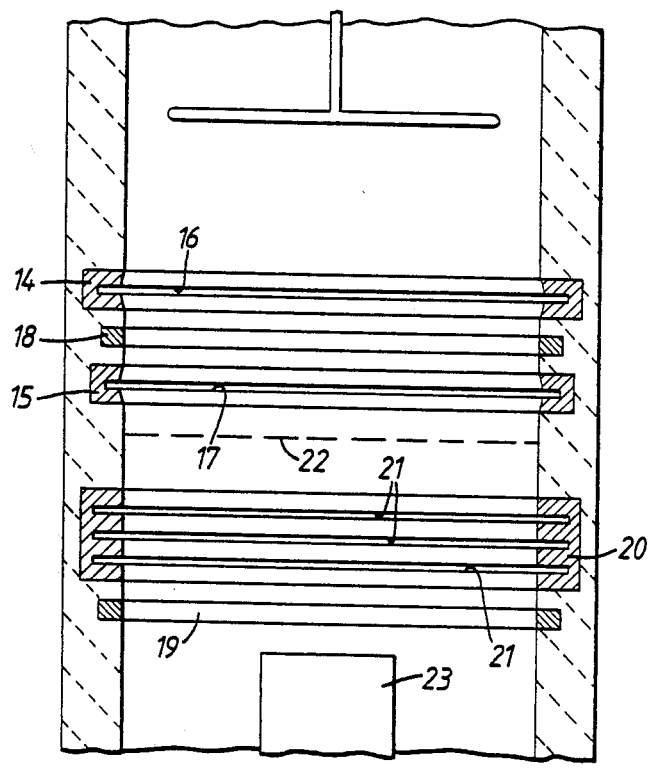

FIG. 3 illustrates another thyratron arrangement, in which two cathode members 14 and 15 are included having slots 16 and 17 respectively, and which are included to provide triggering of the thyratron when desired. In this embodiment the anode member 18 is located between the two cathode members 14 and 15. A further anode member 19 is also included in the arrangement adjacent a cathode member 20, which has a plurality of parallel slots 21 around its circumference. Prior to triggering the main thyratron discharge current, a potential difference is applied between the cathode member 20 and anode member 19 to produce an electron beam sheet extensive of each of the slots 21 in the region between the grid 22 and the thyratron main cathode 23. Thus a primary discharge is obtained, which reduces jitter and decreases the main current rise time when current conduction through the thyratron is required. The surfaces of the triggering cathode members 14 and 15 are curved to provide some focusing of the electron beam sheets.

Figure 4:
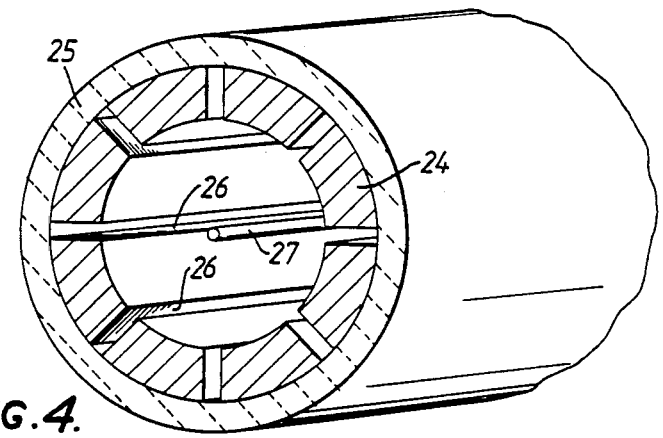
FIG. 4 schematically illustrates a laser arrangement in accordance with the invention.

With reference to FIG. 4, a laser arrangement includes a cylindrical cathode member 24 which is surrounded by a ceramic envelope tube 25 and includes a plurality of slots 26 which each have a width of a millimetre or so and which are aligned with the longitudinal axis of the tube 25. A rod anode member 27 is located along the longitudinal axis of the tube 25. Windows (not shown) are included at each end of the tube 25. The tube 25 and cathode member 24 contain a gas or vapour at a pressure of a fraction of a torr or so, such that when a suitably high potential difference of a few kilovolts is applied between the anode member 27 and cathode member 24 a plurality of electron beam sheets are produced extensive of the slots 26. The electron beam sheets cause excitation of the gas filling, enabling laser action to be achieved.

We claim:

1. Apparatus for forming an electron beam sheet comprising an envelope filled with a gas, a metal cathode member in said envelope, having an elongate slot in a surface thereof, and an anode member in said envelope in a predetermined position relative to said cathode, such that on application of a suitably large potential difference between said anode and cathode members to produce electrical discharges in said gas so as to bombard said slot with ions of said gas, an electron beam sheet including secondary emission of electrons from surface of said slot is formed extensive in a direction away from said slot.

2. Apparatus as claimed in claim 1 wherein said slot is arcuate.

3. Apparatus as claimed in claim 2 wherein said slot is endless.

4. Apparatus as claimed in claim 1 wherein the electron beam sheet is arranged to extend substantially continuously over an area defined by said slot.

5. Apparatus as claimed in claim 1 wherein the surface of said cathode member in which said slot is located is curved so as to focus said electron beam sheet.

6. Apparatus as claimed in claim 1 wherein said anode member extends substantially parallel to, and is of the same length as, said slot.

7. Apparatus as claimed in claim 1 wherein a plurality of elongate slots are included in the surface of said cathode member, such that on application of a suitably large potential difference between said anode and cathode members to produce electrical discharges in said gas so as to bombard said slots with ions of said gas, an electron beam sheet if formed extensive of each slot, each sheet including secondary emission of electrons from surfaces of the slot of which the sheet is extensive.

8. A thyratron, comprising an envelope filled with a gas, a thyratron cathode in said envelope; a thyratron anode in said envelope spaced from said thyratron anode; a control grid electrode in said envelope between said thyratron anode and said thyratron cathode; a metal cathode member in said envelope, having an elongate slot in a surface thereof; and an anode member in said envelope in a predetermined position relative to said cathode member, such that on application of a suitably large potential difference between said anode and cathode members to produce electrical discharges in said gas so as to bombard said slot with ions of said gas, an electron beam sheet including secondary emission of electrons from the surface of said slot is formed extensive in a direction away from said slot, thereby to produce ionization within said envelope.

9. A thyratron as claimed in claim 8, including means for triggering the thyratron into conduction with the electron beam sheet.

10. A thyratron as claimed in claim 9 wherein said anode and cathode members are located in said envelope so as to produce the electron beam sheet in the region of an aperture of said control grid electrode.

11. A thyratron as claimed in claim 8 including means for producing a primary discharge within said envelope prior to conduction of a main discharge current, with the electron beam sheet.

12. A thyratron as claimed in claim 8 wherein said slot is located circumferentially around an inner peripheral surface of said envelope.

13. A thyratron as claimed in claim 8 wherein said anode member forms part of a wall of the thyratron.

14. A laser, comprising an enclosure filled with a gaseous active laser medium; a metal cathode member in said envelope, having an elongate slot in a surface thereof; and an anode member in said envelope in a predetermined position relative to said cathode member, such that on application of a suitably large potential difference between said anode and cathode members to produce electrical discharges in said gaseous active laser medium so as to bombard said slot with ions of said gaseous active laser medium, an electron beam sheet including secondary emission of electrons from surface of said slot is formed extensive in a direction away from said slot, thereby to provide pumping power to at least part of the gaseous active laser medium.

* * * * *